United States Patent [19]

Fukuda et al.

[11] 4,038,366

[45] July 26, 1977

[54] METHOD FOR REMOVING HYDROGEN SULFIDE

[75] Inventors: Yutaka Fukuda, Yokohama; Mutsumi Ihida, Tokyo; Yoshihiko Kawai, Yokohama, all of Japan

[73] Assignee: Nippon Kokan Kabushiki Kaisha, Tokyo, Japan

[21] Appl. No.: 590,090

[22] Filed: June 25, 1975

[30] Foreign Application Priority Data

June 29, 1974 Japan .................................. 49-74768

[51] Int. Cl.² .................. B01D 53/34; C25B 1/00
[52] U.S. Cl. ............................ 423/234; 423/555;
423/637; 204/98; 204/104; 204/128
[58] Field of Search .............. 423/234, 555, 242, 636;
204/98, 104, 128, 98, 101

[56] References Cited

U.S. PATENT DOCUMENTS

| | | | |
|---|---|---|---|
| 3,409,520 | 11/1968 | Bolmer | 204/101 |
| 3,523,755 | 8/1970 | McRae | 204/104 X |
| 3,801,698 | 4/1974 | Lowrance et al. | 423/234 |

Primary Examiner—Earl C. Thomas
Attorney, Agent, or Firm—Flynn & Frishauf

[57] ABSTRACT

A method for removing hydrogen sulfide from a hydrogen sulfide entrained gas comprises the steps of bringing the hydrogen sulfide entrained gas into contact with an alkaline absorption solution with a pH of 10 to 14 to cause hydrogen sulfide in the gas to be absorbed into an alkaline absorption solution, subjecting the resultant absorption solution to a DC electrolytic treatment whereby an alkaline solution is separated into a cathode chamber and sulfur and sulfuric acid are separated into an anode chamber, and circulating as the alkaline absorption solution the alkaline solution produced within the cathode chamber. This constitutes a closed system, thereby completely eliminating a cause for public nuisance.

4 Claims, 1 Drawing Figure

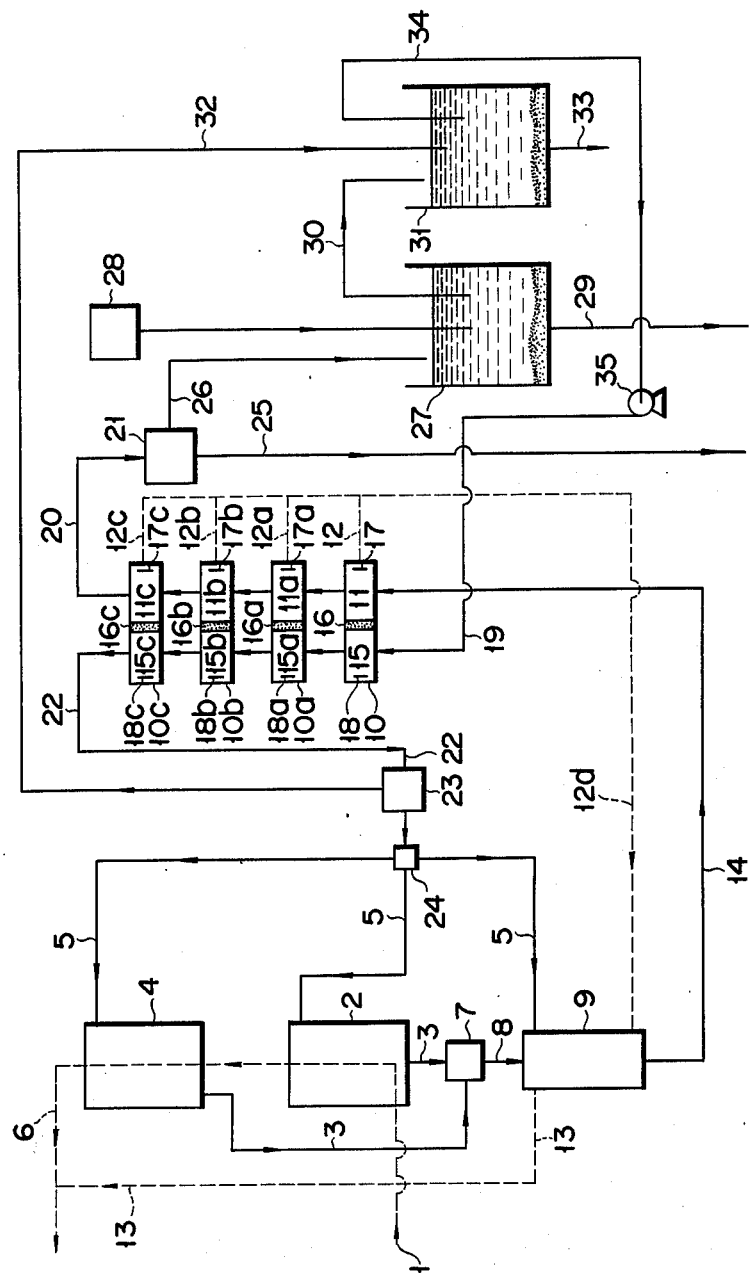

METHOD FOR REMOVING HYDROGEN SULFIDE

This invention relates to a method for selectively removing hydrogen sulfide from a hyrogen sulfide entrained gas without involving occurrence of public nuisance.

For example, the following methods are known for removing hydrogen sulfide from a hydrogen sulfide entrained gas such as a coke oven gas from iron works, exhaust gas from a petroleum refining process, various fuel gasses, etc.

Japanese Pat. No. 427,094 (Takahax method)
Japanese Pat. No. 248,065 (Fumaks method)
Japanese Pat. No. 401,331 (Stretford method)

In these methods, hydrogen sulfide is absorbed into an alkaline solution under the presence of a catalyst such as, for example, picric acid, vanadium pentoxide, napthoquinone sulfonate, etc. and the H₂S-absorbed solution is further air-oxidized, the reaction equations of which are as follows:

$$H_2S + Na_2CO_3 \rightleftharpoons NaHS + NaHCO_3 \quad (1)$$

$$NaHS + \tfrac{1}{2}O_2 \rightleftharpoons NaOH + S \quad (2)$$

Sulfur recovered from hydrogen sulfide exists in the form of polysulfide. Polysulfide is reacted with cyanide included in, for example, a coke oven gas to produce thiocyanate. Since thiocyanate is noxious, a waste water including such a material can not be discharged into a river. These methods involve the disadvantage that 15 to 30% of total alkali is consumed by being air-oxidized to produce thiosulfate, sulfate, etc.

Also known is a method, such as an Otto, Collyn and Bishoff method, in which hydrogen sulfide in a coke oven gas is removed by cleaning the coke oven gas with an aqueous solution of ammonium hydroxide having a concentration of, for example, about 1.5%. Any of these methods is low in desulfurization percentage and involves the disadvantage that, for example, 0.5 to 0.75g of hydrogen sulfide per 1 Nm³ of the coke oven gas is not removed. Since $CO_2$ is included in the coke oven gas, it is absorbed into an absorption solution, thereby lowering the desulfurization percentage. Furthermore, as a sulfur content removed from the gas is recovered in the form of hydrogen sulfide, aftertreatment of the recovered hydrogen sulfide is also necessary.

It is accordingly the object of this invention to provide a method for effectively removing hydrogen sulfide from a hydrogen sulfide entrained gas without involving occurrence of public nuisance.

According to this invention there is provided a method for removing hydrogen sulfide, comprising the steps of bringing a hydrogen sulfide entrained gas into contact with an alkaline absorption solution with a pH of 10 to 14 to cause hydrogen sulfide in the gas to be absorbed into the alkaline absorption solution; introducing the resultant alkaline absorption solution into at least one diaphragm type electrolytic bath, equipped with a cation exchange membrane as a diaphragm, to subject it to a DC electrolytic treatment whereby an alkaline solution is separated into a cathode chamber of the electrolytic bath and sulfur and sulfuric acid are separated into an anode chamber of the electrolytic bath; and circulating as the alkaline absorption solution an alkaline solution produced in the cathode chamber.

In another aspect of this invention, the above-mentioned method further includes the steps of separating into sulfur and sulfuric acid the mixture of the sulfur and sulfuric acid produced in the anode chamber; reacting the recovered sulfuric acid with lime to produce gypsum and, after gypsum is recovered through filtering, circulating the gypsum filtrate as a solution for the cathode chamber of the electrolytic bath.

This invention can be more fully understood from the following detailed description when taken in conjunction with the accompanying drawings, in which:

The FIGURE shows a flow sheet of one embodiment of this invention.

A method for removing hydrogen sulfide from a coke oven gas will now be described by referring to the flow sheet shown in the FIGURE.

A coke oven gas 1 is introduced into a first absorption tower 2 where it is in contact with an alkaline absorption solution flowing down from the upper portion of the absorption tower 2 to absorb hydrogen sulfide from the coke oven gas. The coke oven gas leaving the first absorption tower 2 enters into a second absorption tower 4 where it likewise comes into contact with an alkaline solution flowing down from the upper portion of the second absorption tower 4 to absorb hydrogen sulfide from the coke oven gas. Though NaOH is used as an alkaline absorption solution, use may be made of caustic alkali such as KOH, NH₄OH, LiOH, RbOH, CsOH, etc.

Within the first and second absorption towers 2 and 4, H₂S is absorbed as NaHS into the alkaline absorption solution as expressed in the following chemical equations:

$$H_2S + NaOH \rightarrow NaHS + H_2O \quad (3)$$

$$CO_2 + 2NaOH \rightarrow Na_2CO_3 + H_2O \quad (4)$$

$$Na_2CO_3 + H_2S \rightarrow NaHCO_3 + NaHS \quad (5)$$

As the absorption tower use may be made of a packed tower, plate tower, wetted-wall tower, spray tower, etc. made of a corrosion resistant material such as plastics, glass, pottery, stainless steel, plastics-lined iron, etc., particularly, a tower packed with a tellerette is preferred.

Though the alkaline absorption solution used has a pH of 10 to 14, a normal NaOH solution was used having a pH of more than 13 and a concentration of 0.8N to 1.0N. The NaOH was alkali recovered from an electrolytic cell as will be explained below.

After hydrogen sulfide in the coke gas has been removed by being absorbed into NaOH, the so cleaned coke oven gas 6 can be used as a chemical material or fuel. Table 1 shows a comparison in the content of H₂S and CO₂ between the coke oven gas (A) before introduction into the absorption tower 2 and the coke oven gas (B) cleaned through the absorption towers 2 and 4.

Table 1

|     | H₂S      | CO₂  |
|-----|----------|------|
| (A) | 3200 ppm | 2.7% |
| (B) | 24 ppm   | 2.3% |

The H₂S-absorbed NaOH solutions within the absorption towers 2 and 4 show a pH of about 9 to 12 and are mixed within a mixing bath 7 to give a mixed solution 8. The mixed solution 8 is hereinafter referred to as a coke oven gas desulfurized waste solution. The composition and pH of the coke oven gas desulfurized waste solution are shown, by way of example, in Table 2.

Table 2

| | NaHS | Na$_2$SO$_4$ | Na (total) | pH |
|---|---|---|---|---|
| Concentration (g/l), pH | 12.6 | 12.7 | 21.5 | 10 |

In an absorption method for causing hydrogen sulfide to be absorbed into an alkaline solution, an absorption solution is usually used in a manner to be circulated through the absorption tower, the reason of which is as follows. Suppose that as an alkaline absorbing solution use is made of soda for instance. In the case of an absorption solution including NaOH alone a high cost results, since there is no method for producing NaOH as a recovery alkali. For this reason, an absorption solution including Na$_2$CO$_3$ as a principal component has been used. Since a reaction velocity between Na$_2$CO$_3$ and H$_2$S is not so rapid as a reaction velocity between NaOH and H$_2$S, the absorption solution is used in a manner to be circulated through the absorption tower. A ratio L/G of an amount of alkaline absorption solution l/hr to an amount of gas flowed (Nm$^3$/hr) within the absorption tower as attained by circulating the absorption solution including Na$_2$CO$_3$ as a principal component is usually about 15 to 25. Since the absorption tower of the type, in which an absorption solution is circulated, requires a great L/G ratio, CO$_2$ in a coke oven gas is excessively absorbed and the pH of the coke oven gas desulfurized waste solution is lowered to 8 to 10. The desulfurized waste solution with a pH of 8 to 10 includes a high proportion of NaHCO$_3$. For this reason, the percentage of desulfurization in the circulatory system is below 30% and the coke oven gas desulfurized waste solution can not be effectively used as an absorption solution. When the low pH desulfurized waste solution is introduced into an electrolytic cell to effect electrolysis, H$_2$S is generated due to a rapid drop of pH in the electrolytic cell, resulting in lowered electrolytic efficiency. In consequence, it is impossible to effect an effective electrolytic treatment.

In a method according to this invention, however, only NaOH can be used without using Na$_2$CO$_3$ as an absorption solution. That is, an H$_2$S-absorbed NaOH can be recovered through an electrolytic treatment as will be described later and be repeatedly used by directly circulating it, as an absorption solution, through the absorption tower. Therefore, the use of NaOH as an absorption solution will not result in high cost. Since the reaction time between NaOH and H$_2$S is very short, it is not necessary to circulate the absorption solution and it is only sufficient to pass the absorption solution, at one pass, through the absorption tower. For this reason, L/G becomes very small. For example, L/G at the absorption tower 2 was 0.1 to 0.4, while L/G at the absorption tower 4 was 0.2 to 0.6. Consequently, a ratio between a total amount of alkali absorption solution used and a total amount of coke oven gas is 0.3 to 1.0, which is very small compared with L/G at the absorption tower of the type in which an absorption solution is circulated. The effective height of the absorption tower is about 15 to 30mm in the case of the circulation type and it may be about 1 to 3mm according to this invention. This permits the capacity of the absorption tower to be reduced to a greater extent. Furthermore, the cost of electric power involved in circulating the absorption solution can also be markedly reduced.

Though there has been explained the case where hydrogen sulfide is removed, through absorption into the alkaline solution, from the coke oven gas whose concentration is high, i.e. 3200 ppm, if a gas with a low concentration of H$_2$S is cleaned with an alkaline solution, only one absorption column will be sufficient and L/G of the order of about 0.1 will be sufficient.

Since the method of this invention can maintain a high final pH of the desulfurized waste solution, i.e. of the order of more than 10, an elevated desulfurization efficiency is obtained and no bad influence is exerted on the subsequent electrolytic process with the attendant advantage.

The coke oven gas desulfurized waste solution 3, after H$_2$S has been removed through the absorption towers 2 and 4, is mixed at the mixing bath 7 and introduced into an electrolytic gas absorption tower 9, where the desulfurized waste solution absorbs anode cell gases 12, 12a, 12b and 12c as evolved at anode chambers 11, 11a, 11b and 11c of four series-arranged electrolytic baths 10, 10a, 10b and 10c, respectively. Alkali absorption solution 5, in addition to desulfurized waste solution 8, is also introduced into the electrolytic gas absorption tower. The following Table shows, by way of example, the composition of an anode cell gas 12d before being introduced into the electrolytic gas absorption tower and the composition of the gas 13 cleaned at the electrolytic gas absorption tower.

Table 3

| | CO$_2$ | H$_2$S | N$_2$ | H$_2$ | O$_2$ | CO | CH$_4$ |
|---|---|---|---|---|---|---|---|
| Anode cell gas 12d | 60.1 | 36.2 | 1.5 | 0.5 | 0.4 | 1.3 | traces |
| Cleaned gas 13 | 79.8 | 3.1 | 11.3 | 0.9 | 3.1 | 1.2 | 0.6 |

The flow of anode cell gas 12d is small, i.e. less than 1/100 of the flow of coke oven gas. The gas 13 so cleaned at the electrolytic gas absorption tower is mixed with the gas 6 leaving the absorption tower 4 and it is utilized as a chemical material or fuel.

The treated waste solution 14 leaving the electrolytic gas absorption tower 9 is high in alkali concentration and is passed through the anode chambers 11, 11a, 11b and 11c of the series-arranged electrolytic baths 10, 10a, 10b and 10c, respectively. The composition and pH of the treated waste solution 14 are shown, by way of example, in Table 4.

Table 4

| | NaHS | Na$_2$SO$_4$ | NaHCO$_3$ | Na (total) | pH |
|---|---|---|---|---|---|
| Concentration (g/l), pH | 21.5 | 12.7 | 31.0 | 21.5 | 8.2 |

The electrolytic baths 10, 10a, 10b and 10c are diaphragm type electrolytic baths, and the anode and cathode chambers 11 and 15, 11a and 15a, 11b and 15b, and 11c and 15c are divided by cation exchange membranes 16, 16a, 16b and 16c, respectively. Anodes 17, 17a, 17b and 17c are disposed within the anode chambers 11, 11a, 11b and 11c, respectively, and cathodes 18, 18a, 18b and 18c are disposed within the cathode chambers 15, 15a, 15b and 15c, respectively. These anode and cathode electrodes are connected, respectively, to the anode and cathode electrodes of a DC power source. A solution 19 with a lesser content of Na$^+$ is sequentially sent into the respective cathode chambers 15, 15a, 15b and 15c. As an electrode plate, use may be made of an insoluble plate such as platinum, graphite, etc. Graphite may be used as an anode and iron be used as a cathode. Both the electrodes are preferred to be spaced at a distance of 5 to 15 mm. Each cation exchange membrane is disposed between both the cathode and anode electrodes and it is possible to use a one to several tens of pairs of electrode plates with a cation exchange membrane disposed between one pair of electrode plates within each electrolytic bath. It is preferred that an electrolytic voltage and current density as applied across the pair of cathode and anode electrodes within each electrolytic bath be 3 to 5V and 2 to 3A/dm², respectively. As a cation exchange membrane use may be made of, for example, a material commercially available under the trade name of permaplex C-10 (manufactured by the Permutit Co., Ltd.).

The reaction of each electrode within each electrolytic bath is as follows:

At the anode $HS^-$ is oxidized to a simple sulfur or $SO_4^{--}$ based on the electrode reaction as shown in equations (6) and (7).

$$HS^- \rightarrow S + H^+ + 2e \qquad (6)$$

$$HS^- + 4H_2O \rightarrow SO_4^{--} + 9H^+ + 8e \qquad (7)$$

At the cathode, on the other hand, the following electrode reaction takes place:

$$2H_2O + 2e^- \rightarrow H_2\uparrow + 2OH^- \qquad (8)$$

To maintain the electric neutralization of the whole system, $Na^+$ migrates from each anode chamber through the cation exchange membrane to each cathode chamber. As a result, the pH of the solution within each anode chamber is lowered to, for example, less than 1. A suspension of the sulfur and sulfuric acid is produced within each anode chamber and sent through a pipe 20 into a sulfur filter 21. Through migration of $Na^+$ from each anode chamber through each cation exchange membrane to each cathode chamber the recovered alkaline solution is increased in concentration of NaOH and is sent through a pipe 22 to a recovered alkaline solution 23. Some of the recovered alkaline solution is sent to an alkaline solution tank 24 where it is further sent through pipes 5 to the absorption towers 2, 4 and 9, respectively.

The suspension of sulfur and sulfuric acid is filtered at the sulfur filter 21 to remove the sulfur 25 and the so filtered sulfuric acid solution 26 is delivered into a gypsum reaction bath 27 where it is reacted with lime etc. from a lime reservoir 28 to produce gypsum 29. The gypsum 29 is used as a building material, etc. That is, the sulfur content is fixed as gypsum and made harmless. When the insoluble plate was used as an anode, sulfur showed a high purity of more than 99.9%.

After completion of the reaction at the gypsum reaction bath 27 the supernatant liquid or infiltrate is further sent into a gypsum removing bath 31 to remove the gypsum content. When at the gypsum removing bath 31 the alkaline solution 32 recovered from the recovery alkaline bath 23 is added to the supernatant liquid or filtrate 30 so that pH is adjusted to be more than 12, a white gruelly $Ca(OH)_2$ precipitate 33 is produced. The supernatant liquid 34 within the gypsum removing bath 31 is a solution with a lesser content of Na, which is sent as the solution 19 sequentially into the cathode chambers 15, 15a, 15b and 15c of the series-arranged electrolytic baths 10, 10a, 10b and 10c, respectively. The solution 19 is mixed with an electrolytic solution to effect eletrolysis.

pH of an electrolytic solution in each anode chamber is prominently lowered (pH < 1) through electrolysis. As a result, $CO_3^{--}$ and $HCO_3^-$ give off $CO_2$ gas and some of $HS^-$ generates an $H_2S$ gas. These gases are collected together and delivered as a gas 12d into the electrolytic gas absorption tower 9. $H_2S$ is circulated, either in the gaseous form or in the form dissolved into the absorption solution, through the anode chamber, gas 12d, electrolytic gas absorption column 9 and treated waste solution 14, thus serving to maintain the $HS^-$ concentration of the treated waste solution 14 high. This constitutes an important aspect of this invention.

The amount of control electricity in the electrolytic bath is determined by a known amount of electricity, as computed from the equations (6) and (7), which is required to effect oxidation of $HS^-$. Since the migration of $Na^+$ is effected simultaneously with the oxidation reaction of $HS^-$, an amount of $Na^+$ migrated is an electrochemical equivalent corresponding to an amount of electricity required to effect oxidation of $HS^-$.

As will be evident from the above, this invention provides an excellent method for removing $H_2S$ from the $H_2S$-entrained gas, with a high desulfurization percentage, without producing any poisonous gas or waste water. Since gypsum, calcium oxide, etc. as by-products are water-insoluble, a closed system entirely free of any cause for public nuisance is completed, thus contributing much to this field of art. Furthermore, the expensive alkaline solution can be recovered through electrolysis so that it can be used cyclically. It is possible to use only caustic alkali as an absorption solution without using the heretofore employed alkali carbonate. For this reason, a high $H_2S$-absorbing percentage can be attained and, in consequence, $H_2S$ can be sufficiently absorbed merely by passing it, at one pass, through the absorption tower. This makes it possible to reduce the capacity of the absorption tower, thus requiring a reduced cost of power. The method of this invention is very economical and assures a long-term stabilized operation. Since the gypsum, etc. as a by-product can be used as a building material, it is of high value from the standpoint of its utilization. Furthermore, it is possible to recover sulfur in high purity, i.e. with more than 99.9%.

One example of this invention will be described for better understanding the nature of this invention.

Example $H_2S$ in an $H_2S$-entrained gas was removed using the same device as shown in the flow sheet of the Figure. Use was made, as an $H_2S$-entrained gas, of a coke oven gas including 3200 ppm of $H_2S$ and 2.7% of $CO_2$. The composition of the treated waste solution 14 leaving the electrolytic gas absorption column 9 is shown in Table 4.

The treated waste solution 14 was passed sequentially through the series-arranged electrolytic baths 10, 10a, 10b and 10c. As the diaphragms 16, 16a, 16b and 16c of the electrolytic baths 10, 10a, and 10b and 10c use was made of permaplex C-10 and as both the electrode plates, of graphite plates. The treated waste solution 14 was subjected to an electrolytic treatment and $Na^+$ was migrated from each anode chamber to each cathode chamber. The amount of electricity required to effect migration of $Na^+$ was 78 A.H. per liter of an aqueous solution of NaOH equivalent to the Na content of the treated waste solution, when computed from the electrochemical equivalent of Na+. The migration of Na+ as involved when the treated waste solution was electrolytically treated 3 l/hr was about 63g. The composition and pH of the cleaned sulfuric acid solution 26 obtained by passing the treated waste solution through the series-arranged electrolytic baths 10, 10a, 10b and 10c and filtering it through the sulfur filter is shown in Table 5.

Table 5

| | $H_2SO_4$ | $Na_2SO_4$ | $SO_4$ (total) | pH |
|---|---|---|---|---|
| Concentration (g/l) pH | 13.6 | 13.3 | 4.3 | 0.8 |

At the gypsum reaction bath 27 the sulfuric acid solution 28 was reacted with lime from the lime reservoir, the reaction equation of which is as follows:

$$H_2SO_4 + CaCO_3 \rightarrow CaSO_4 + H_2O + CO_2 \uparrow \quad (9)$$

After completion of the neutralization reaction the supernatant liquid 30 showed a pH of 5 to 6 (i.e. was substantially water) and contained a Ca content of about 0.7 g/l. When it was sent by a pump 35 into the cathode chamber 15, $Ca(OH)_2$ was precipitated with an increase in pH (pH > 13), resulting in clogging of the pump 35 and the consequent clogging of the pipe. In order to avoid such inconveniences the supernatant liquid 30 was introduced, together with the recovery alkaline solution, into the lime separating bath 31 to attain a pH of more than 12, thereby precipitating $Ca(OH)_2$. After $Ca(OH)_2$ was removed, the supernatant liquid 34 was supplied by the pump 35 to the series-arranged electrolytic baths. In this example, the supernatant liquid 34 within the lime separating bath 31 showed a pH of 13 and contained 0.009g of Ca per liter. Such amount of Ca presents almost no problem in the long-term continuous operation.

What we claim is:

1. A method for removing hydrogen sulfide from a hydrogen sulfide entrained gas comprising the steps of bringing the hydrogen sulfide entrained gas into contact with a caustic alkaline solution with a pH of 10 to 14 to cause hydrogen sulfide in the hydrogen sulfide entrained gas to be absorbed into said caustic alkaline solution (A); introducing the resultant alkaline solution (B) into a least one diaphragm type electrolytic bath, equipped with a cation exchange membrane as a diaphragm, to subject it to a DC electrolytic treatment whereby a alkaline solution (C) is separated and recovered in a cathode chamber of the electrolytic bath, and sulfur and sulfuric acid are separated into an anode chamber of the electrolytic bath; and circulating as said caustic alkaline solution (A) the recovered alkaline solution (C) separated in the cathode chamber.

2. A method according to claim 1, in which hydrogen sulfide in a gas generated in said anode chamber is further absorbed into a mixture of said alkaline solution (B) and said alkaline solution (C).

3. A method according to claim 1, further including the steps of separating into sulfur and sulfuric acid the mixture of sulfur and sulfuric acid produced in the anode chamber of said electrolytic bath; reacting the recovered sulfuric acid with lime to produce gypsum and, after gypsum is recovered through filtering, circulating the gypsum filtrate as a solution for the cathode chamber of the electrolytic bath.

4. A method according to claim 1, further including the steps of separating into sulfur and sulfuric acid the mixture of sulfur and sulfuric acid produced in the anode chamber of said electrolytic bath, reacting the recovered sulfuric acid with lime to produce gypsum and, after gypsum is recovered through filtering, adding the recovery alkali solution to the resultant gypsum filtrate to attain a pH of more than 12, thereby precipitating $Ca(OH)_2$, and circulating the filtrate for use as a solution for the cathode chamber of the electrolytic bath.

* * * * *

UNITED STATES PATENT AND TRADEMARK OFFICE
CERTIFICATE OF CORRECTION

PATENT NO. : 4,038,366
DATED : July 26, 1977
INVENTOR(S) : YUTAKA FUKUDA et al

It is certified that error appears in the above-identified patent and that said Letters Patent are hereby corrected as shown below:

Column 2, line 51: after "coke", insert ---oven---.

Column 3, lines 65 and 66: replace "mm" with ---m---.

Column 5, lines 24 and 25: replace "HS" with ---$HS^-$---.

Column 5, line 25: replace "$SO_4$" with ---$SO_4^{--}$---.

Column 6, line 2: rewrite "eletrolysis" as ---electrolysis---.

Column 8, line 4: after "solution", insert ---(A)---.

Signed and Sealed this

Twenty-ninth Day of May 1979

[SEAL]

Attest:

RUTH C. MASON
Attesting Officer

DONALD W. BANNER
Commissioner of Patents and Trademarks